(12) United States Patent
Konishi

(10) Patent No.: US 11,693,825 B2
(45) Date of Patent: Jul. 4, 2023

(54) INFORMATION PROCESSING APPARATUS, CONTROL METHOD, AND RECORDING MEDIUM STORING PROGRAM

(71) Applicant: SHARP KABUSHIKI KAISHA, Sakai (JP)

(72) Inventor: Yohsuke Konishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 174 days.

(21) Appl. No.: 17/157,231

(22) Filed: Jan. 25, 2021

(65) Prior Publication Data

US 2021/0232541 A1 Jul. 29, 2021

(30) Foreign Application Priority Data

Jan. 27, 2020 (JP) .................................. 2020-010843

(51) Int. Cl.

| | | |
|---|---|---|
| *G06F 16/16* | (2019.01) | |
| *H04N 1/00* | (2006.01) | |
| *G06V 20/62* | (2022.01) | |
| *G06V 30/32* | (2022.01) | |
| *G06V 30/413* | (2022.01) | |
| *G06V 30/28* | (2022.01) | |
| *G06V 30/148* | (2022.01) | |
| *G06F 16/14* | (2019.01) | |
| *H04L 1/04* | (2006.01) | |

(Continued)

(52) U.S. Cl.

CPC ............ *G06F 16/164* (2019.01); *G06V 20/62* (2022.01); *G06V 30/32* (2022.01); *G06V 30/413* (2022.01); *H04N 1/00331* (2013.01); *G06F 16/14* (2019.01); *G06V 30/153* (2022.01); *G06V 30/287* (2022.01); *G06V 30/416* (2022.01); *H04L 1/04* (2013.01); *H04N 2201/0094* (2013.01)

(58) Field of Classification Search

CPC ....... G06F 16/164; G06F 16/14; G06V 20/62; G06V 30/32; G06V 30/413; G06V 30/416; G06V 30/287; G06V 30/153; H04N 1/00331; H04N 1/04; H04N 2201/0094

See application file for complete search history.

(56) References Cited

U.S. PATENT DOCUMENTS

| | | | |
|---|---|---|---|
| 6,885,481 B1 | 4/2005 | Dawe | |
| 11,297,192 B2 * | 4/2022 | Mori | ...................... G06V 10/96 |

(Continued)

FOREIGN PATENT DOCUMENTS

| | | |
|---|---|---|
| JP | 2002074321 A | 3/2002 |
| JP | 2005-275849 A | 10/2005 |
| JP | 2005311729 A | 11/2005 |

*Primary Examiner* — Quoc A Tran
(74) *Attorney, Agent, or Firm* — ScienBiziP, P.C.

(57) ABSTRACT

An information processing apparatus includes: a determiner that determines an area including a handwritten figure from image data; a recognizer that recognizes a handwritten character from the handwritten figure; an acquirer that acquires a file name; and a file generator that generates a file with a file name based on a handwritten character when the recognizer recognizes the handwritten character based on the image data and generates a file with the file name acquired by the acquirer when the recognizer does not recognize a handwritten character.

14 Claims, 14 Drawing Sheets

(51) Int. Cl.
*G06V 30/416* (2022.01)
*G06F 17/00* (2019.01)

(56) References Cited

U.S. PATENT DOCUMENTS

2004/0093568 A1* 5/2004 Lerner .................. G06F 40/171
715/268
2019/0303701 A1* 10/2019 Kazume ................ G06F 40/284

* cited by examiner

FIG. 3

| HANDWRITING AREA INFORMATION |
|---|
| (30,50) - (280,90) |
| (250,10) - (330,40) |
| ⋮ |

INFORMATION PROCESSING APPARATUS, CONTROL METHOD, AND RECORDING MEDIUM STORING PROGRAM

BACKGROUND OF THE INVENTION

Field of the Invention

The present invention relates to an information processing apparatus, or the like.

Description of the Background Art

Conventionally, there are image forming apparatuses that transmit image data on a read document, or the like, from the image forming apparatus to another apparatus. For example, the scan to e-mail function is known, in which the image forming apparatus reads a document in accordance with a reading instruction from the user and transmits an e-mail with the image data on the read document as an attached file to the destination designated by the user.

To transmit a file from the image forming apparatus to another apparatus, typically, the user needs to operate a control panel to enter a file name or select a prepared item so as to determine a file name. Therefore, there is a disclosed technique for easily setting a file name. For example, there is a disclosed technique in which optical character recognition (OCR) processing is performed on image data to extract a character string and multiple character strings are selected to form a file name, high-frequency nouns are combined to form a file name, or a feature word is extracted from an extracted character string and set as a file name (see, for example, Japanese Patent Application Laid-Open No. 2005-275849).

SUMMARY

Disclosure of the Invention

According to the technique disclosed in Japanese Patent Application Laid-Open No. 2005-275849, the image forming apparatus sets a file name based on the character string extracted during OCR processing. Unfortunately, it is possible that the file name desired by the user does not appear in the image data. In this case, although the image forming apparatus extracts a character string from the image data, the extracted character string does not include the file name desired by the user. Therefore, it is difficult for the image forming apparatus to set the file name desired by the user even though the image forming apparatus causes the user to select the extracted character string or extracts a feature word from the extracted character string.

It is considered that high-frequency nouns in extracted character strings are nouns contained in many sentences and the nouns are likely to have no characteristic meanings. Therefore, the image forming apparatus is likely to set, as a file name, the character string that does not have a specific meaning and is difficult to understand the content even though high-frequency nouns are combined.

In view of the above-described disadvantage, the present invention has an object to provide an information processing apparatus, or the like, with which the user may easily set a file name.

SUMMARY OF THE INVENTION

To solve the above-described disadvantage, an information processing apparatus according to the present invention includes: a determiner that determines an area including a handwritten figure from image data; a recognizer that recognizes a handwritten character from the handwritten figure; an acquirer that acquires a file name; and a file generator that generates a file with a file name based on a handwritten character when the recognizer recognizes the handwritten character based on the image data and generates a file with the file name acquired by the acquirer when the recognizer does not recognize a handwritten character.

A control method according to the present invention includes: determining an area including a handwritten figure from image data; recognizing a handwritten character from the handwritten figure; acquiring a file name; and generating a file with a file name based on a handwritten character when the handwritten character is recognized at the recognizing based on the image data and generating a file with the file name acquired at the acquiring when a handwritten character is not recognized at the recognizing.

A computer-readable recording medium according to the present invention having stored therein a program that causes a computer to execute: a determination function to determine an area including a handwritten figure from image data; a recognition function to recognize a handwritten character from the handwritten figure; an acquisition function to acquire a file name; and a file generation function to generate a file with a file name based on a handwritten character when the recognition function recognizes a handwritten character based on the image data and generate a file with the file name acquired by the acquisition function when the recognition function does not recognize a handwritten character.

According to the present invention, the user may easily set a file name.

BRIEF DESCRIPTION OF THE DRAWINGS

FIG. 3 is a table illustrating a data structure of handwriting area information according to the first embodiment;

DESCRIPTION OF THE PREFERRED EMBODIMENTS

An embodiment of the present invention is described below with reference to the drawings. According to the present embodiment, an image forming apparatus including an information processing apparatus to which the present invention is applied is described as an example. The present invention may be applied to an information processing apparatus, such as a terminal device or a server device, or an image reading device, such as a scanner.

1. First Embodiment

1.1 Functional Configuration

Figure 1:
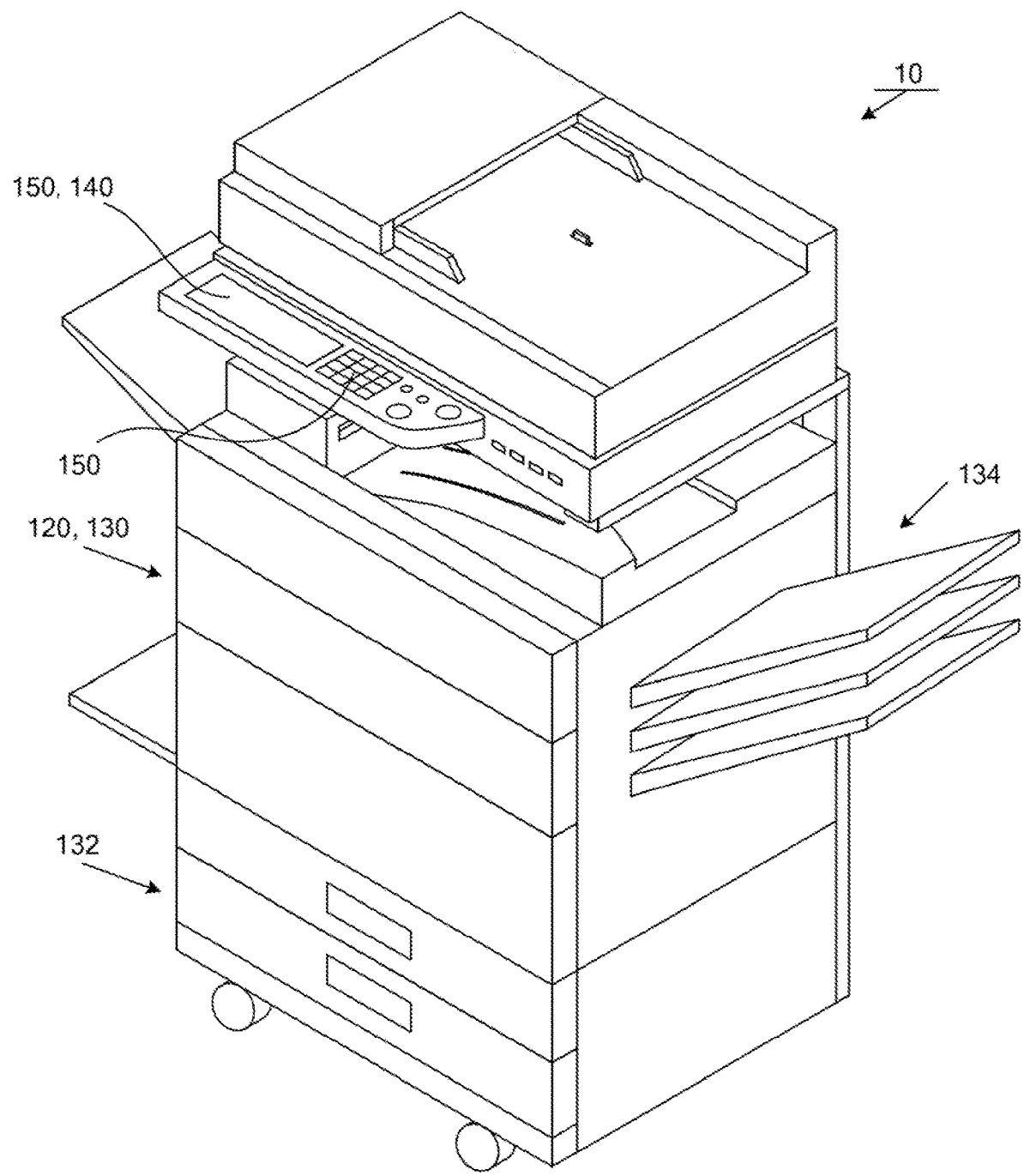
FIG. 1 is an external perspective view of an image forming apparatus according to a first embodiment.
Figure 2:
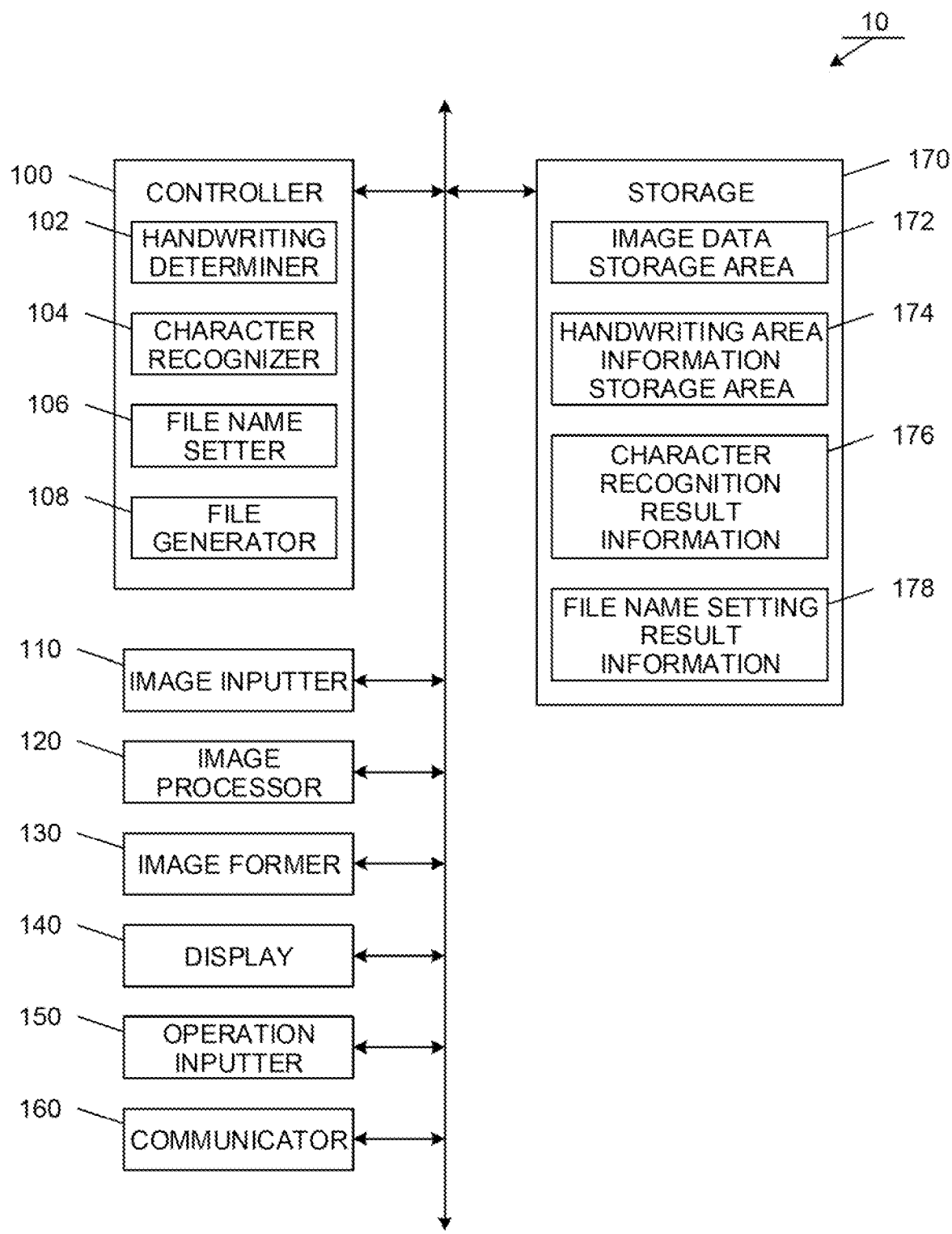
FIG. 2 is a block diagram illustrating a functional configuration of the image forming apparatus according to the first embodiment.

A functional configuration of an image forming apparatus 10 according to the present embodiment is described with reference to FIGS. 1 and 2. FIG. 1 is an external perspective view of the image forming apparatus 10, and FIG. 2 is a functional configuration diagram of the image forming apparatus 10. As illustrated in FIG. 2, the image forming apparatus 10 includes a controller 100, an image inputter 110, an image processor 120, an image former 130, a display 140, an operation inputter 150, a communicator 160, and a storage 170.

The controller 100 is a functional unit that controls the overall image forming apparatus 10. The controller 100 includes, for example, one or more arithmetic devices (such as central processing units (CPUs)) to read and execute various programs so as to perform various functions. The controller 100 reads and executes a program stored in the storage 170 to also function as a handwriting determiner 102, a character recognizer 104, a file name setter 106, and a file generator 108.

The handwriting determiner 102 according to the present embodiment determines an area (handwriting area) including a handwritten figure from image data. The handwritten figure is a figure handwritten on a document by a user and including a character (e.g., alphanumeric character, hiragana, katakana, kanji, or symbol), dot, line, rectangle, etc.

The handwriting determiner 102 determines whether it is a handwritten figure based on, for example, the characteristics of the pixel of an edge included in image data. In image data, it is assumed that the density of the pixel of the edge of the figure created by handwriting changes slightly as compared to the density of the pixel of the edge of other than handwriting (e.g., a typed character that is a printed character or a figure of other than handwriting). Based on this assumption, the handwriting determiner 102 determines whether the density of the pixel of an edge included in a handwritten figure changes slightly.

The handwriting determiner 102 calculates the amount of change in the pixel density at the rising or falling portion on an edge-by-edge basis. The handwriting determiner 102 compares the calculated amount of change in the density with the threshold indicating the upper limit of the amount of change in the density regarded as the edge of the character created by handwriting. When the amount of change in the pixel density at the rising or falling portion of the edge of interest is less than the threshold, the handwriting determiner 102 determines that the edge of interest is an edge of the handwritten figure created by handwriting. When the amount of change in the pixel density at the rising or falling portion of the edge of interest is equal to or more than the threshold, the handwriting determiner 102 determines that the edge of interest is an edge of the figure created by a method other than handwriting. It is determined that the area including a certain range of the edge of the handwritten figure is a handwriting area.

Other than the above-described method, a known technique such as the method disclosed in Japanese Patent No. 4420877 may be used as the method for determining a handwriting area from image data.

The handwriting determiner 102 stores, as handwriting area information, the information with which a handwriting area included in image data may be identified in a handwriting area information storage area 174 of the storage 170. The handwriting area information includes, for example, the coordinates (e.g., "(30, 50)-(280, 90)") of image data with which the rectangular area including a handwritten figure may be identified. The coordinates of the image data are represented as (x, y) where, when the upper left pixel of the image data is the origin, the number of pixels included from the origin to the pixel of interest in the horizontal direction is x and the number of pixels in the vertical direction is y. The handwriting area information may be the coordinates of the vertices of the assumed polygonal area including a handwritten figure.

It is considered that, when the user writes on a document by hand, the user writes characters by hand on a certain area of the document, such as a margin area that contains no typed characters or photographs. In order to determine a handwriting area from a certain area of the image data, the handwriting determiner 102 may set the area (margin area) corresponding to the margin area of the document and then determine a handwriting area from the margin area.

For example, the handwriting determiner 102 sets the area from the edge of each side of image data by a predetermined distance (for example, the distance or the number of pixels corresponding to 3 cm) as a margin area to determine that the area including the handwritten figure written on the edge of the image data is a handwriting area. In this case, the handwriting determiner 102 does not handle the area including the handwritten figure written in an area other than the edge of the image data (for example, the handwritten figure forming the characters written by the user as a note) as a handwriting area.

The method for setting a margin area is not limited to the above-described range. For example, the handwriting determiner 102 may set an area around the corner of image data as a margin area or may set only an area from the edge of a specific side (e.g., the lower side) of image data by a predetermined distance (number of pixels) as a margin area.

The handwriting determiner 102 may set a margin area based on the result of an image data area separation process executed by the image processor 120 described below. For example, when the image processor 120 executes the process to separate the image data into a character area, a photograph area, a halftone dot area, and a background area, the handwriting determiner 102 may set an area included in none of the areas as a margin area. The character area here refers to an area including a typed character that is a printed character. In this case, the margin area is an area other than the area containing a printed character, figure, or picture and is an area other than a background area.

The character recognizer 104 recognizes a character from image data. The character recognizer 104 executes, for example, optical character recognition (OCR) processing on image data to recognize a handwritten character and a typed character. According to the present embodiment, a handwritten character refers to a character that is formed of a handwritten figure and that is recognized based on the handwritten figure. A typed character refers to a character that is recognized based on a figure other than a handwritten figure and, specifically, is recognized based on the font represented by printing.

For example, the character recognizer 104 executes character recognition with regard to a handwritten figure included in the handwriting area determined by the handwriting determiner 102. Thus, the character recognizer 104 may recognize the handwritten character based on the handwritten figure. As a result, the character recognizer 104 does not recognize a typed character even when a handwritten character and the typed character are represented in the image data. According to the present embodiment, the character recognizer 104 stores a recognized character as character recognition result information 176 in the storage 170. A handwritten character may be a character string of two or more characters.

The character recognizer 104 may recognize handwritten characters directly from image data without using the information on the handwriting area determined by the handwriting determiner 102. For example, the storage 170 previously stores a dictionary DB containing a pattern of handwritten characters. The character recognizer 104 may use the dictionary DB to recognize handwritten characters by pattern recognition.

The character recognizer 104 may directly recognize only handwritten characters from the image data or may recognize handwritten characters together with a character (e.g., a typed character) other than handwritten characters, exclude the typed characters from the target to be recognized as characters, and recognize the handwritten characters only. The character recognizer 104 may execute character recognition using machine learning or may use an external handwritten character recognition library.

The file name setter 106 sets the file name of a file generated by the file generator 108 described below. According to the present embodiment, the file name refers to a character string including a base name (basis name) and an extension and including no character string indicating a folder, a device, a host, or a protocol. According to the present embodiment, the extension refers to a character string including a period and one or more characters followed by the period. For example, "sample.jpg" is a file name. In "sample.jpg", "sample" is a base name, and ".jpg" is an extension. The file name setter 106 stores the set file name as file name setting result information 178 in the storage 170.

The file generator 108 generates a file. According to the present embodiment, the file generator 108 generates a file based on image data stored in an image data storage area 172. For example, the file generator 108 generates a file (e.g., a Portable Document Format (PDF) file) in which one or more sets of image data are combined into one file. The file generator 108 may generate a different file (e.g., a Joint Photographic Experts Group (JPEG) format file or a Tagged Image File Format (TIFF) file) for each set of image data. For example, the format of a file generated by the file generator 108 may be designated by the user or may be previously set.

The image inputter 110 is a functional unit that reads an image on the document and generates image data. For example, the image inputter 110 includes a scanner device, or the like, which converts an image into an electric signal with an image sensor such as a charge coupled device (CCD) or a contact image sensor (CIS) and executes quantization and encoding on an electric signal to generate digital data. The image inputter 110 may also read multiple documents at one time and, when multiple documents are read, generates image data for each document.

The image processor 120 is a functional unit that performs various types of image processing on image data. For example, the image processor 120 performs the process to separate image data into any of a character area, a photograph area, a halftone dot area, and a background area and performs the process to detect an edge from image data.

The image former 130 is a functional unit that forms an image on a recording medium (e.g., recording sheet). For example, the image former 130 feeds a recording sheet from a sheet feed tray 132 of FIG. 1, forms an image on the surface of the recording sheet, and discharges the recording sheet with the image formed thereon to a sheet ejection tray 134. The image former 130 includes, for example, an electrophotographic laser printer.

The display 140 is a functional unit that displays various types of information to a user and includes, for example, a liquid crystal display (LCD) or an organic electro-luminescence (EL) display. The operation inputter 150 is a functional unit that receives operation instructions from a user and includes a hardware key (e.g., a numeric keypad), a button, and the like. The image forming apparatus 10 may include a touch panel in which the display 140 and the operation inputter 150 are integrally formed. The method for detecting an input on the touch panel may be any typical detection method, such as a resistive method, an infrared method, an electromagnetic induction method, or a capacitive method.

The communicator 160 is a functional unit that connects to another apparatus or network to perform communications such as transmitting a file from the image forming apparatus 10 to another apparatus or receiving a job from another apparatus to the image forming apparatus 10. The communicator 160 is configured as, for example, an interface enabling communications, and the connection method may be either wired or wireless or both.

The storage 170 is a functional unit that stores various programs and various types of data necessary for operations of the image forming apparatus 10. The storage 170 includes, for example, a solid state drive (SSD), which is a semiconductor memory, or a hard disk drive (HDD).

According to the present embodiment, the storage 170 includes the image data storage area 172 and the handwriting area information storage area 174 and stores the character recognition result information 176 and the file name setting result information 178.

The image data storage area 172 is an area that stores image data generated by the image inputter 110.

The handwriting area information storage area 174 is an area that stores handwriting area information. As illustrated in FIG. 3, the handwriting area information includes, for example, the coordinates (e.g., "(30, 50)-(280, 90)") with which a handwriting area may be identified.

The character recognition result information 176 is information indicating the characters recognized by the character recognizer 104 and is text data such as "conference A material". The file name setting result information 178 is information indicating the file name set by the file name setter 106 and is text data such as "conference A material.pdf".

1.2 Process Flow

Figure 4:
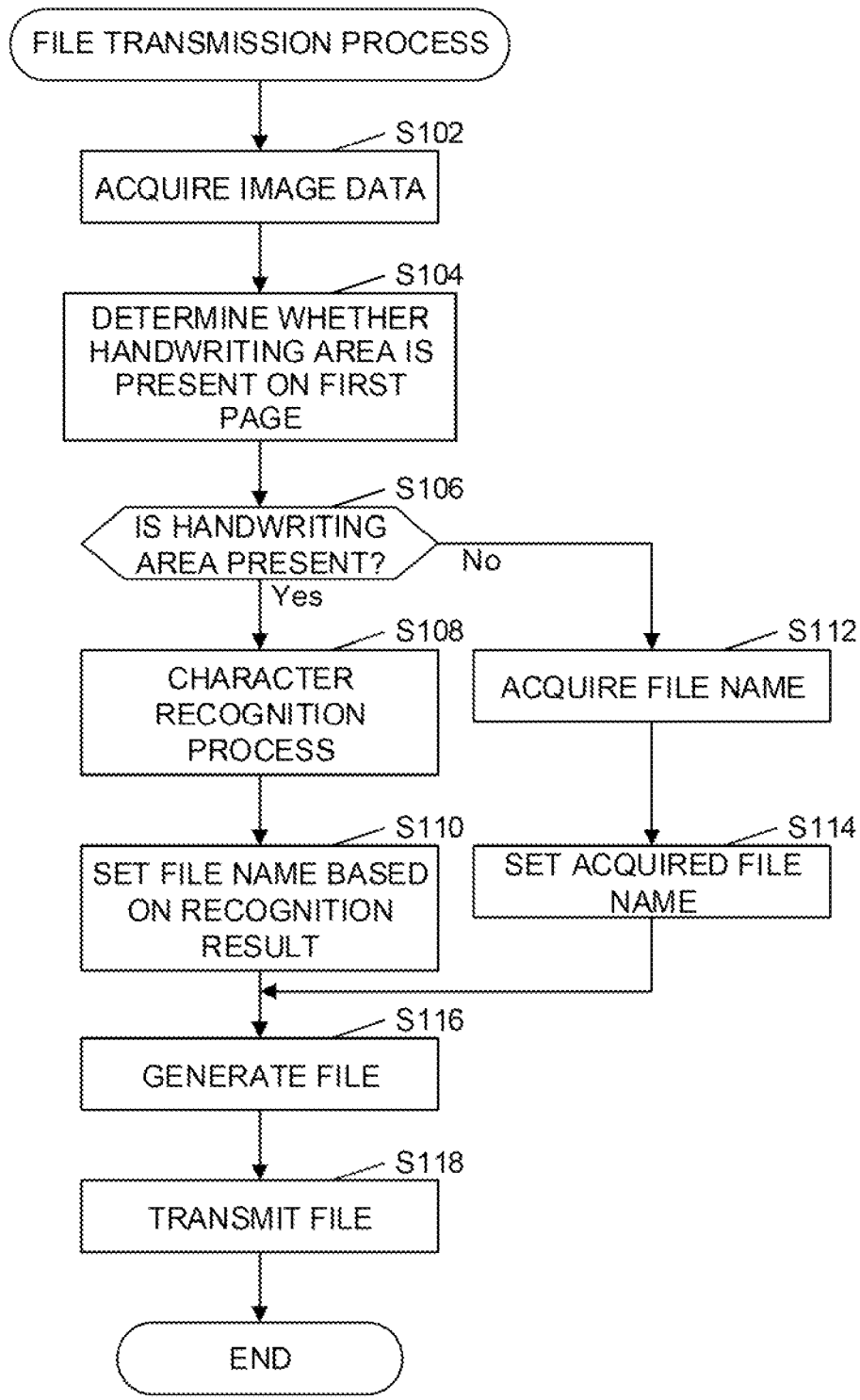
FIG. 4 is a flowchart illustrating a file transmission process according to the first embodiment.

A file transmission process of the image forming apparatus 10 is described with reference to FIG. 4. The file transmission process is a process in which the image forming apparatus 10 generates a file based on image data and transmits the file to another apparatus. The file transmission process is a process in which the controller 100 reads a program from the storage 170 and executes the program.

First, the controller 100 acquires image data (Step S102). To acquire image data, for example, the controller 100 controls the image inputter 110 so as to read one or more documents, generates image data based on an RGB signal input from the image inputter 110, and thus acquires the image data. The controller 100 may store the acquired image data in the image data storage area 172 and assign an attribute, such as the generation date and time, the number indicating the reading order, or the data name, to the image data.

Subsequently, the controller 100 determines whether a handwriting area is present on a first page (Step S104). For example, first, the handwriting determiner 102 determines a handwriting area on the first page and stores the handwriting area information in the handwriting area information storage area 174. Then, the controller 100 determines whether the handwriting area information storage area 174 stores the handwriting area information. In this case, when the handwriting area information storage area 174 stores the handwriting area information, the controller 100 may determine that the handwriting area is present on the first page. The first page is a first document (a document on the first page) read by the image inputter 110. The read document itself is the first page of the document when the document read by the image inputter 110 has one page, and the first read document is the first page of the document when the document read by the image inputter 110 has two or more pages. The controller 100 may perform the process at Step S104 when the image data on the first page is acquired or may perform the process at Step S104 after all the image data on the documents are acquired. When the image data storage area 172 stores the image data, the controller 100 may identify and read the image data on the first page of the document based on information such as the generation date and time or the reading order that is the attribute of the image data.

Subsequently, the controller 100 verifies the result of the determination of a handwriting area performed at Step S104 to determine whether a handwriting area is present (Step S106).

When a handwriting area is present, the character recognizer 104 performs a character recognition process (Yes in Step S106; Step S108). Specifically, first, the character recognizer 104 reads the handwriting area information from the handwriting area information storage area 174 to acquire the coordinates of the handwriting area. Then, the character recognizer 104 reads the image data on the area identified with the coordinates of the handwriting area from the image data corresponding to the document on the first page and recognizes characters from the read image data. The character recognizer 104 stores the recognized characters (text data) as the character recognition result information 176 in the storage 170. Thus, the character recognizer 104 recognizes the characters from the handwritten figures in the handwriting area so as to recognize the handwritten characters.

Subsequently, the file name setter 106 reads the character recognition result information 176 and sets the file name based on the recognition result of the character recognizer 104 (Step S110). For example, the file name setter 106 sets, as a file name, the character string obtained by attaching the extension corresponding to the format of the file generated by the file generator 108 to the text data stored in the character recognition result information 176. When the character recognition result information 176 is the text data including a period and one or more characters followed by the period, the file name setter 106 may sets, as a file name, the entire text data stored as the character recognition result information 176. The file name setter 106 stores the set file name as the file name setting result information 178.

Conversely, when no handwriting area is present at Step S106, the file name setter 106 acquires a file name (No in Step S106, Step S112). As for the method for acquiring a file name, for example, the file name setter 106 may acquire a file name from the character string input by the user or may acquire a serial-numbered file name. The date and time of a process executed or a random character string may be acquired as a file name. That is, the file name setter 106 acquires the file name that is set in the usual way when no handwritten character is present. The file name setter 106 sets the acquired file name as a file name (Step S114). Specifically, the file name setter 106 stores the set file name in the file name setting result information 178.

Subsequently, the file generator 108 generates a file based on the file name setting result information 178 and image data stored in the image data storage area 172 (Step S116). When the file generator 108 combines one or more sets of image data into one file so as to generate a file, the file generator 108 may set the file name stored as the file name setting result information 178 as the file name of the generated file without change. When the file generator 108 generates one or more sets of image data as different files for the respective sets of image data, the file generator 108 may set, as the file name of the generated file, the file name obtained by attaching the serial number or the date and time to the base name of the file name stored as the file name setting result information 178. Thus, it is possible to prevent multiple files from having the identical file name.

Subsequently, the controller 100 transmits the file generated by the file generator 108 to another apparatus via the communicator 160 (Step S118). For example, the controller 100 attaches the file generated by the file generator 108 to an e-mail and transmits the e-mail to the address designated by the user or transmits the file to a predetermined storage destination such as an external server device.

1.3 Operation Example

Figure 5:
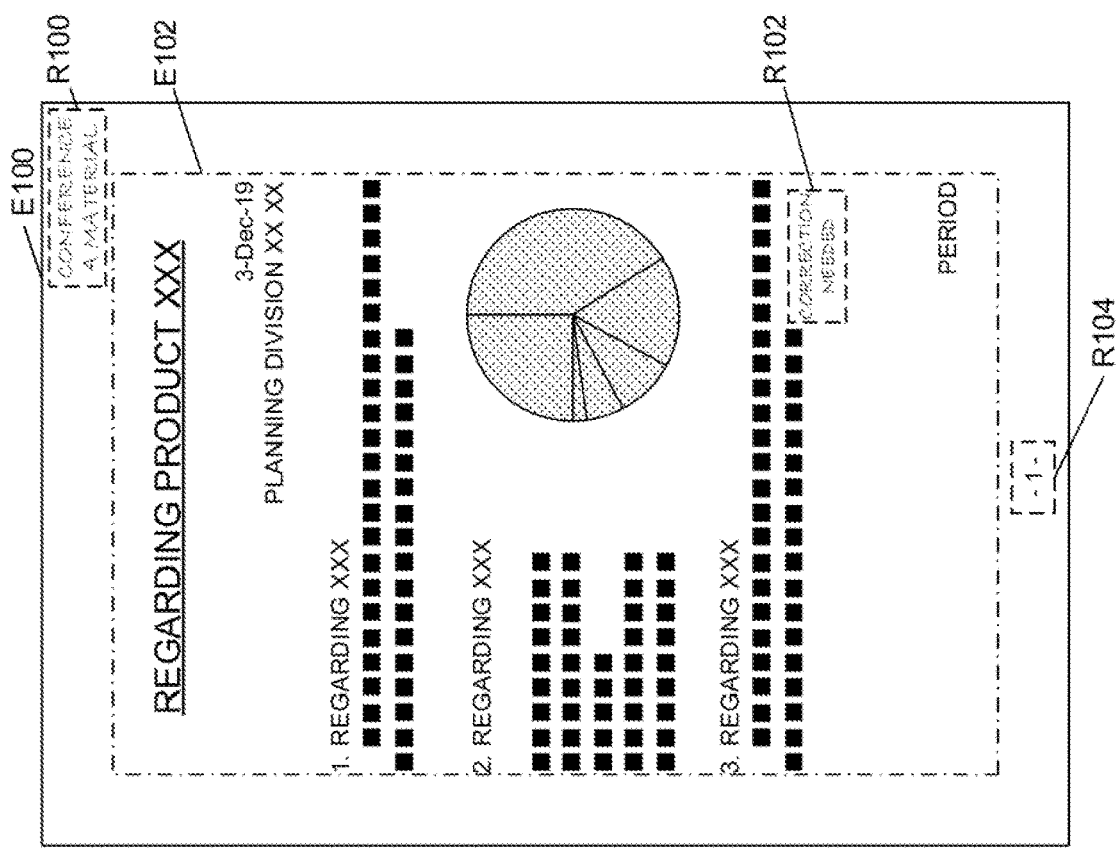
FIGS. 5A and 5B are diagrams illustrating an operation example according to the first embodiment.

An operation example according to the present embodiment is described with reference to FIGS. 5A and 5B. First, with reference to FIG. 5A, the case where a margin area is a predetermined distance from the edge of each side of image data is described. FIG. 5A is a diagram illustrating the image data on the document on the first page read by the image inputter 110. An area E100 in FIG. 5A indicates the entire area of the image data. An area E102 indicates an area inside the margin area. In this case, the margin area is the area outside the area E102 and inside the area E100.

In FIG. 5A, it is assumed that characters (handwritten characters) written by the user's hand are present in the positions illustrated as an area R100 and an area R102. The area R100 includes the image in which "conference A material" is handwritten as a file name in the margin area of the document, and the area R102 includes the image in which "correction needed" is written as a note for the material. An area R104 is a margin area and is an area where a typed character is present, specifically, including the image where the page number "-1-" is printed as a typed character.

To determine a handwriting area from the margin area, the handwriting determiner 102 makes a determination as described below. As the area R100 is an area present in the margin area and the area R100 includes the image of a handwritten figure, the handwriting determiner 102 determines that the area R100 is a handwriting area. As the area R102 is an area not present in the margin area, the handwriting determiner 102 does not determine that the area R102 is a handwriting area. Although the area R104 is an area present in the margin area, the area R104 includes no handwritten figure; therefore, the handwriting determiner 102 does not determine that the area R104 is a handwriting area. Thus, the handwriting determiner 102 determines that only the area R100 is a handwriting area.

As the area R100, which is a handwriting area, is present in the image data, the character recognizer 104 performs a character recognition process on the area R100 that is determined to be the handwriting area by the handwriting determiner 102. As a result of the character recognition process, the characters "conference A material" are recognized and stored as the character recognition result information 176.

Subsequently, the file name setter 106 sets a file name based on the character recognition result information 176. The characters "conference A material" are stored as the character recognition result information 176 and do not include a period and one or more characters followed by the period. Therefore, the file name setter 106 sets, as a file name, the character string obtained by attaching an extension to "conference A material". For example, when the file generated by the file generator 108 is a PDF file, the file name setter 106 sets, as a file name, "conference A material.pdf" obtained by attaching ".pdf", which is the extension of a PDF file, to the character string "conference A material". The file name setter 106 stores the file name "conference A material.pdf" as the file name setting result information 178.

The file generator 108 reads "conference A material.pdf" stored as the file name setting result information 178 and sets "conference A material.pdf" as the file name of the generated file. Thus, the file is generated with the base name of the file name based on the character string "conference A material" written as a file name by the user on the margin area of the document instead of the character string "correction needed" written as a note or the typed character string "–1–".

Although the area where "conference A material" is handwritten is in the margin near the upper side of the area E100 of the image data in FIG. 5A, "conference A material.pdf" is set as a file name even when the area R100 is in a margin other than near the upper side of the area E100 of the image data. The file name is set based on the image data included in the area R100 as only the area R100 is the area corresponding to a handwriting area present in the margin area even if the area R100 is in the margin near the lower side of the area E100 of the image data.

Next, with reference to FIG. 5B, the case where an area other than a character area, a photograph area, a halftone dot area, and a background area is a margin area is described. FIG. 5B is a diagram illustrating the image data on the document on the first page read by the image inputter 110. An area E110 in FIG. 5B indicates the entire area of the image data. The area included in the area E110 and indicated in a chain double-dashed line is an area that is separated as any of a character area, a photograph area, and a halftone dot area by the image processor 120.

Here, the area R110 includes the image in which "conference A material" is handwritten as a file name in the margin area of the document. As the area R110 includes the image, the image processor 120 does not determine that the area R110 is a background area. Therefore, in the area E110, the background area is an area other than the areas surrounded by a chain double-dashed line and the area R110.

Therefore, the area R110 is an area other than a character area, a photograph area, a halftone dot area, and a background area and is a margin area. The handwriting determiner 102 determines whether the area R110, which is an area other than a character area, a photograph area, a halftone dot area, and a background area, is a handwriting area. When the handwriting determiner 102 determines that the area R110 is a handwriting area, a file name is set based on the image included in the area R110.

As described above, according to the present embodiment, the controller 100 may generate, as the file of the image data on the read document, the file with the file name set based on the recognition result of the handwritten characters on the first page, and transmit the file to another apparatus. The user may set a file name by writing characters by hand at any place in a margin area in a case where the margin area is set and by writing characters by hand at any place of the document in a case where no margin area is set. When no handwritten character is present (when no handwritten character is recognized), a file name is acquired in a predetermined way; therefore, the user does not need to write the characters indicating a file name on the document by hand when there is no need to set a file name based on handwritten characters. Therefore, for example, the document does not need to have the field for writing a file name by hand, or even when there is a field for writing a file name by hand, a file name is set in a predetermined way without writing characters in the field by hand.

Even when the image data has a mix of handwritten characters and typed characters, the controller 100 sets a file name based on the handwritten characters. Therefore, for example, even when typed characters appear on the upper side of the image data and handwritten characters appear on the lower side thereof, a file name is set based on the handwritten characters appearing on the lower side.

In the above-described process, the order of the steps may be changed. For example, the process from Step S112 to Step S116 may be performed after Step S102 so as to generate a file in advance. Specifically, first, the file name setter 106 acquires and sets a file name. Subsequently, the file generator 108 generates a file with the file name set by the file name setter 106 and stores the file in the storage 170. Then, when a handwriting area is present on the first page, the controller 100 performs the process at Step S108 and Step S110 to change the file name of the file stored in the storage 170 to the file name based on the file name setting result information 178. Even when the process is performed as described above, the file name is set based on the handwriting area from the image data, and the file with the set file name is generated.

In the description according to the present embodiment, the handwriting determiner 102 determines a handwriting area, and the character recognizer 104 recognizes characters from the handwritten figures included in the handwriting area. When the character recognizer 104 is not able to recognize a character from the handwritten figure included in the handwriting area, the file name acquired by the file name setter 106 may be set as a file name. Specifically, at Step S106, it is further determined whether handwritten characters are recognized from the handwritten figures included in the handwriting area. In this case, a file name is set based on handwritten characters when the handwritten characters are recognized, and the file name acquired by the file name setter 106 is set when no handwritten character is recognized.

When characters are not suitable as a file name even though the character recognizer 104 has recognized the characters, the file name setter 106 may set the file name acquired by the file name setter 106 instead of the recognition result of the character recognizer 104. A case where it is not suitable as a file name includes, for example, a case where the number of recognized characters is small, such as one character, or a case where the recognized characters are not a word used independently in normal cases, such as "for example", "but", or "probably". Thus, the file name setter 106 may set a file name based on the handwritten characters that are considered to have been written by the user with the intention to be set as a file name.

In the description according to the present embodiment, the image forming apparatus 10 transmits a generated file to another apparatus; however, the storage 170 of the image forming apparatus 10 may store a generated file. Thus, it is possible for the user to output a file with the file name set based on a handwriting area as needed.

In the description according to the present embodiment, the character recognizer 104 uses the handwriting area information stored by the handwriting determiner 102 to recognize handwritten characters; however, a different method may be used as long as handwritten characters may be recognized. For example, instead of storing the handwriting area information in the handwriting area information storage area 174, the handwriting determiner 102 clips the portion including the handwritten figure from the image data on the document and stores the clipped image data in the storage 170 separately from the image data on the document. The character recognizer 104 executes a character recognition process on the clipped image data so as to recognize handwritten characters. The character recognizer 104 may perform a character recognition process on the image data on the document and provide the attribute indicating whether the characters are handwritten or typed together with the recognized characters. In this case, the file name setter 106 may set a file name based on the characters included in the recognized characters and having the attribute indicating handwriting attached thereto.

According to the present embodiment, the image forming apparatus may generate a file with the file name based on a handwriting area and transmit the file to another apparatus. Thus, the user's writing the desired file name by hand on the first page of the document may cause the image forming apparatus to generate and transmit the file with the handwritten file name. That is, the user does not need to check whether the typed characters of the document include the desired file name or does not need to operate the operation inputter to enter a file name. Thus, according to the present embodiment, it is possible to provide a highly convenient image forming apparatus.

2. Second Embodiment

Next, a second embodiment is described. The second embodiment is different from the first embodiment in that a file name based on the file name setting result information 178 is displayed as a file name candidate on the display 140 so as to be edited.

Figure 6:
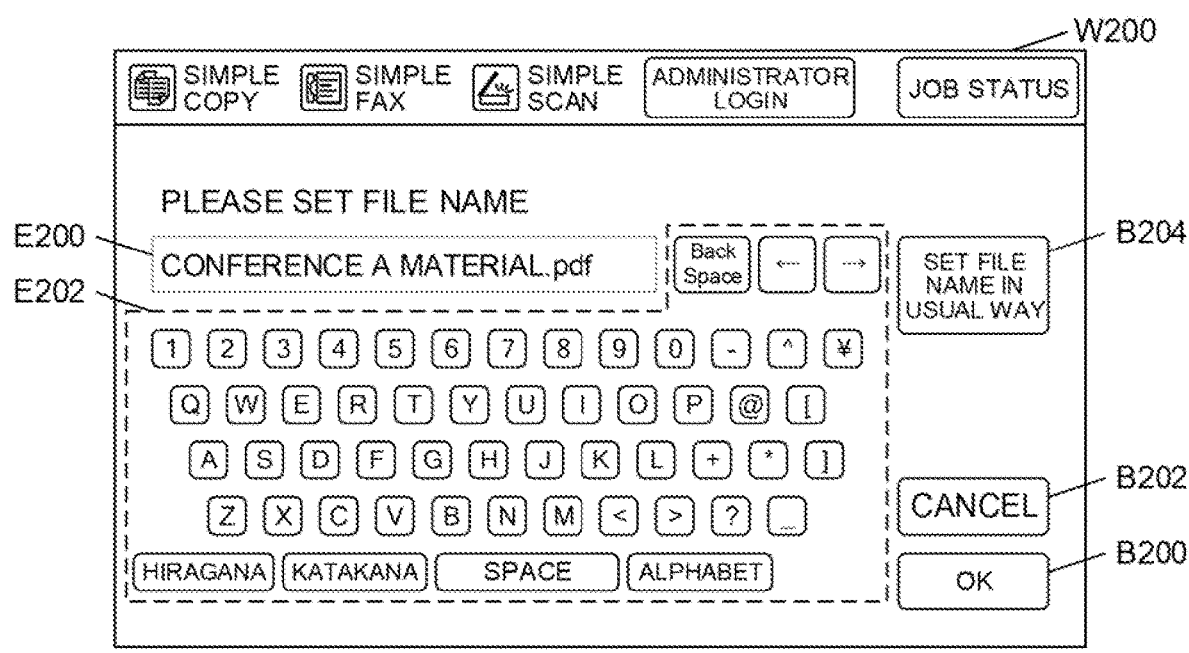
FIG. 6 is a diagram illustrating an operation example according to a second embodiment.

According to the present embodiment, after Step S110 of the file transmission process, the controller 100 performs control to cause the display 140 to present the file name based on the file name setting result information 178. For example, the controller 100 causes a display screen W200 illustrated in FIG. 6 to be displayed so as to present the set file name. The display screen W200 includes an area E200 for displaying a file name. Immediately after the display screen W200 is presented on the display 140, the file name set during the process at Step S110 is displayed on the area E200.

The display screen W200 includes an area E202 for displaying a software keyboard to edit the file name presented on the area E200. The user operates the software keyboard included in the area E202 so as to edit the file name presented on the area E200.

When an OK button B200 is selected by the user, the file name setter 106 stores the character string displayed on the area E200 as the file name setting result information 178. Accordingly, the file generator 108 generates the file with the file name described in the area E200 based on the image data stored in the image data storage area 172. The display screen W200 may include a cancel button B202 for canceling the generation of a file. A button B204 may be included to cancel the file name based on the file name setting result information 178 (the file name based on the recognition result of the character recognizer 104) and set a file name in a usual way. When the button B204 is selected, the file name setter 106 acquires the file name set in the usual way and stores the acquired file name as the file name setting result information 178.

According to the present embodiment, the user may confirm whether the file name desired by the user has been set. Even when the file name not desired by the user has been set, the user may simply make necessary corrections to set the file name.

3. Third Embodiment

Next, a third embodiment is described. Contrary to the first embodiment, a file including no image data on the first page of the document is generated according to the present embodiment. In the present embodiment, FIG. 4 in the first embodiment is replaced with FIG. 7. The same functional units and processes are attached with the same reference numeral, and descriptions are omitted.

Figure 7:
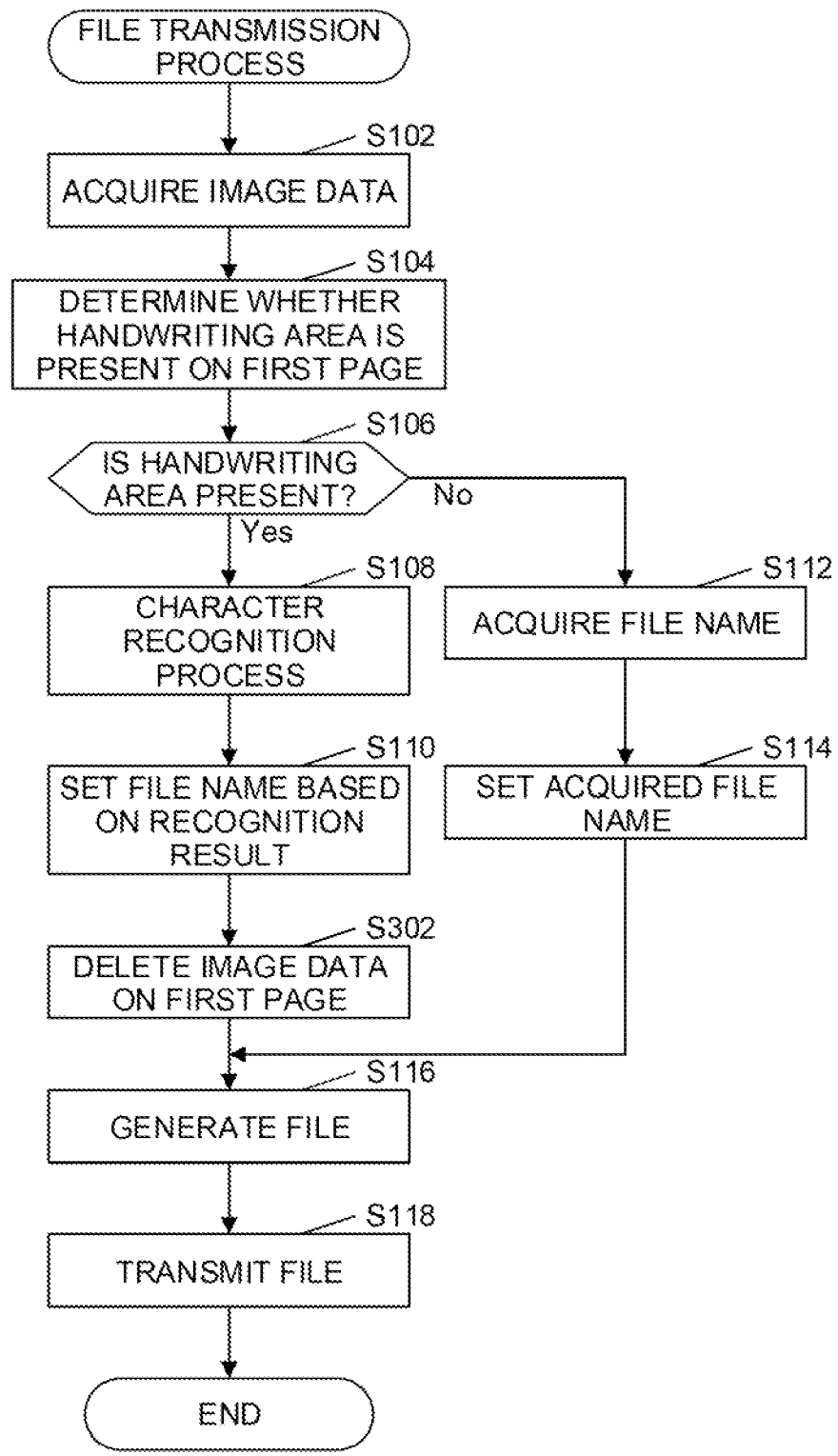
FIG. 7 is a flowchart illustrating a file transmission process according to a third embodiment.

The flow of a file transmission process according to the present embodiment is described with reference to FIG. 7. According to the present embodiment, after the file name setter 106 sets the file name at Step S110, the controller 100 deletes the image data on the first page of the document from the image data storage area 172 (Step S302). For example, the controller 100 identifies the image data corresponding to the document on the first page based on information such as the generation date and time or the reading order, which is the attribute of the image data, and deletes the identified image data from the image data storage area 172.

Subsequently, the file generator 108 performs the process to generate the file at Step S116 so as to generate the file based on the image data except for the image data on the first page of the document (the file including no image data on the first page).

In a case where it is determined at Step S106 that the image data on the first page of the document includes no handwriting area, the controller 100 does not delete the image data on the first page of the document. That is, in a case where the image data on the first page of the document includes no handwriting area, the file generator 108 generates a file based on the image data stored in the image data storage area 172, including the image data on the first page of the document.

The image forming apparatus 10 may select whether the first page is to be deleted when a handwriting area is present on the first page or the first page is not to be deleted even when a handwriting area is present on the first page. For the setting as to whether the first page is to be deleted, for example, the image forming apparatus 10 may have a deletion mode and a non-deletion mode for the first page and prompt the user to select the mode to be operated. Alternatively, the controller 100 may make a selection depending on whether only a handwriting area is present on the first page. Specifically, when an area other than a handwriting area is not present in the image data on the first page of the document, it is determined that the document on the first page is a blank document with handwriting, and the controller 100 deletes the first page. When an area other than a handwriting area is present in the image data on the first page of the document, it is determined that typed characters, photograph, or the like, other than handwritten characters are included, and the controller 100 does not delete the first page.

The file generator 108 may generate a file including the image data in which the handwritten characters recognized from the image data on the first page are represented as typed characters, instead of excluding the image data on the first page. Thus, handwritten characters may be left as typed characters.

According to the present embodiment, the user may write on the first page of the document by hand to designate the file name and, further, the image forming apparatus may generate the file based on the document without the first page. Therefore, for the user who transmits a file, it is possible to prevent the user who receives the file from visually recognizing the handwritten characters. Furthermore, it is possible to prevent the generation of a file that includes only handwritten characters and is unnecessary for the user, e.g., the image file on the first page in which only the file name is written by hand.

4. Fourth Embodiment

Next, a fourth embodiment is described. Contrary to the first embodiment, the handwritten figure included in a handwriting area is filled with the background color in the handwriting area to delete the handwritten characters according to the present embodiment. In the present embodiment, FIG. 4 of the first embodiment is replaced with FIG. 8. The same functional units and processes are attached with the same reference numeral, and descriptions are omitted.

Figure 8:
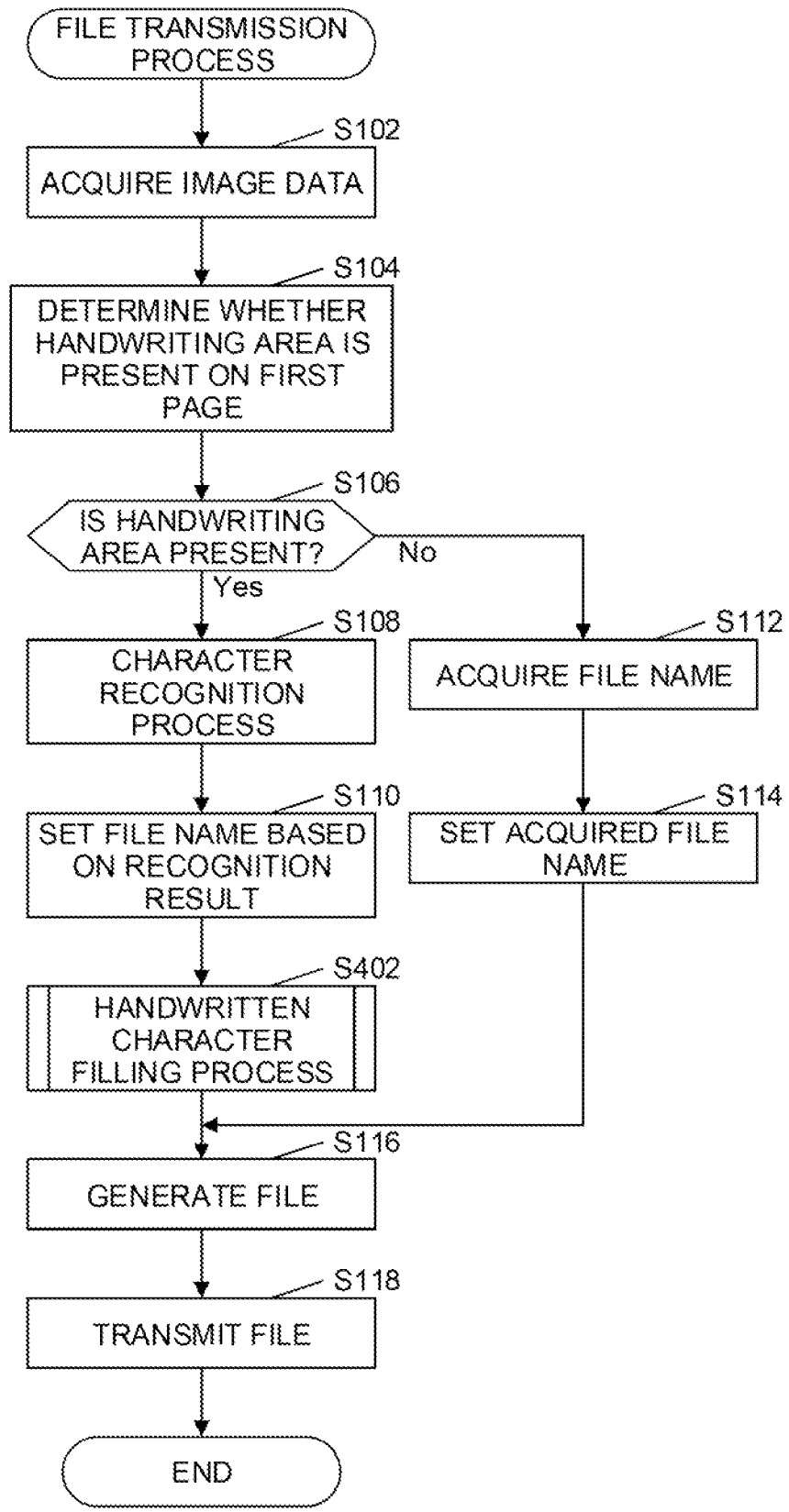
FIG. 8 is a flowchart illustrating a file transmission process according to a fourth embodiment.
Figure 9:
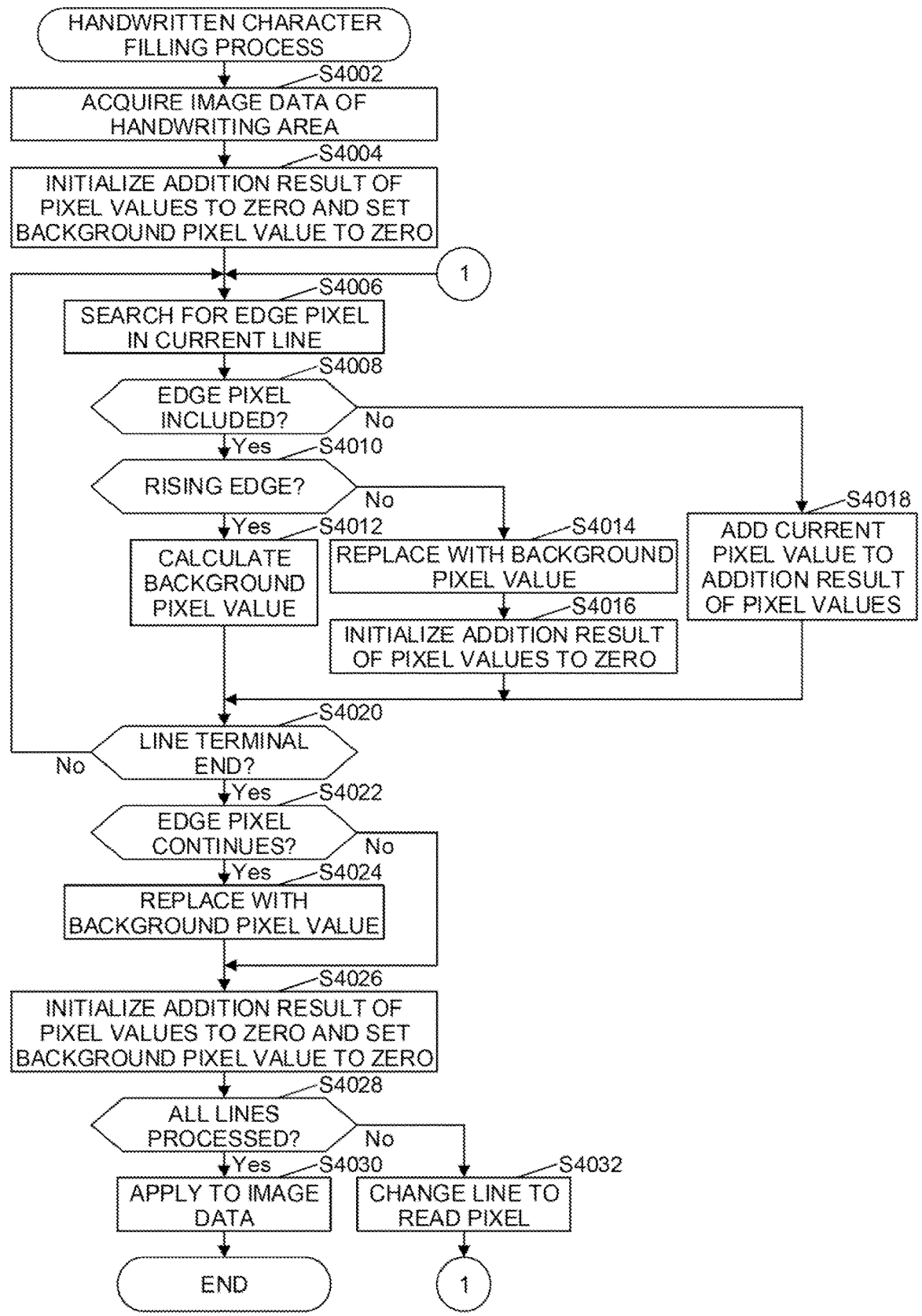
FIG. 9 is a flowchart illustrating a handwritten character filling process according to the fourth embodiment.

The flow of a file transmission process according to the present embodiment is described with reference to FIG. 8. According to the present embodiment, after the file name is set by the file name setter 106 at Step S110, the controller 100 performs a handwritten character filling process (Step S402). The handwritten character filling process is a process to replace the pixels of the handwritten figure (handwritten characters) in the handwriting area with the pixels that are substantially identical to the background color in the image data on the first page of the document stored in the image data storage area 172. The handwritten character filling process causes the image data targeted for the handwritten character filling process to become the image data in which the handwritten figure (handwritten characters) written in the document is filled with the background color. The handwritten character filling process is described with reference to FIG. 9.

First, the controller 100 acquires the image data of the handwriting area that is targeted for the character recognition process by the character recognizer 104 at Step S108 (Step S4002). Specifically, the controller 100 reads the image data on the first page of the document from the image data storage area 172 and further reads the handwriting area information from the handwriting area information storage area 174. The controller 100 may identify the area specified by the handwriting area information from the image data on the first page of the document and acquire the image data on the identified area.

Subsequently, the controller 100 initializes the addition result of pixel values to zero and sets the background pixel value to zero (Step S4004). The addition result of pixel values is the value obtained by, by the controller 100, reading the pixels of the image data and adding the pixel values of the read pixels. For the addition result of pixel values, the addition result of pixel values of the respective color components is stored in accordance with the number of color components contained in the image data. When the number of color components contained in the image data is one, for example, when the image data is gray-scaled, the value of 1 is stored as the addition result of pixel values. When the number of color components contained in the image data is more than one (for example, three of an R component, a G component, and a B component), for example when the image data is colored, the values corresponding to the number of color components are stored.

Subsequently, the controller 100 reads the image data of the handwriting area along a line to scan the pixels one by one from the leading end of the line in the horizontal direction and search for the edge pixel in the currently scanned line (Step S4006). The line is an area corresponding to one line during scanning of the image data of the handwriting area in the horizontal direction. The height of a line may correspond to one pixel or multiple pixels.

Subsequently, the controller 100 determines whether the read pixels include an edge pixel (Step S4008). When it is determined that an edge pixel is included, the controller 100 then determines whether it is a rising edge (Yes in Step S4008; Step S4010). When it is determined that it is a rising edge, the controller 100 sets a background pixel value based on the addition result of the pixel values (Yes in Step S4010; Step S4012). Here, the controller 100 sets, as a background pixel value, the pixel value substantially identical to the pixel values of the pixels around the edge pixel. For example, as a background pixel value for each color component, the controller 100 sets the value obtained by dividing the addition result of the pixel values by the number of pixels included in the section from the pixel at the leading end of the line or the last read pixel at the falling edge to the pixel immediately before the rising edge. Thus, the average value of the pixel values in the background around the edge pixel is set as a background pixel value. For example, when the height of a line corresponds to multiple pixels, the average value of the pixel values of the pixels is set as a background pixel value. The controller 100 may set the pixel value of the pixel read immediately before the rising edge as a background pixel value or may set the average value of the pixel values of the pixels that are included in the pixels on the line but are not edge pixels as a background pixel value.

Conversely, when it is not determined that it is a rising edge at Step S4010, the controller 100 replaces the pixel values of the pixels included from the pixel at the rising edge to the current pixel with the background pixel value (No in Step S4010; Step S4014). Here, the pixel value substantially identical to the pixel value around the edge pixel is set as a background pixel value at Step S4012. Therefore, during the process at Step S4014, the pixel value of the edge pixel is replaced with the pixel value calculated based on the pixel values of the pixels included in the area around the edge pixel. As a result, the pixel value of the edge pixel is replaced with a value close to the pixel value around the edge pixel so that the edge pixel has a color that is difficult for the user to recognize. Subsequently, the controller 100 initializes the addition result of the pixel values to zero (Step S4016).

When it is not determined that the read pixels include an edge pixel (when the read pixels include no edge pixel) at Step S4008, the controller 100 adds the current pixel value to the addition result of the pixel values for each color component (No in Step S4008; Step S4018).

Subsequently, the controller 100 determines whether the pixels have been read up to the line terminal end, which is the end opposite to the line leading end (Step S4020). When the reading has not been executed up to the line terminal end, the process returns to Step S4006 (No in Step S4020; Step S4006). Conversely, when the reading has been executed up to the line terminal end, the controller 100 then determines whether the edge pixel continues (Yes in Step S4020; Step S4022). When the edge pixel continues, the pixel values of the pixels from the last read pixel at the rising edge to the current pixel are replaced with the background pixel value (Yes in Step S4022; Step S4024).

Subsequently, the controller 100 initializes the addition result of the pixel values to zero and sets the background pixel value to zero (Step S4026). Then, the controller 100 determines whether all the lines have been processed (Step S4028).

When all the lines have been processed, the controller 100 applies the image data of the handwriting area in which the handwriting area is filled with the background pixel value to the image data on the first page of the document (Yes in Step S4028; Step S4030). Specifically, the controller 100 reads the image data on the first page of the document from the image data storage area 172, replaces the handwriting area with the image data on the handwriting area, and stores the image data again. The controller 100 reads the handwriting area information stored in the handwriting area information storage area 174 to identify the position of the handwriting area. Thus, the image data on the first page of the document is replaced with the image data in which the handwritten figure in the handwriting area is filled with the background pixel value.

Conversely, when all the lines have not been processed, the line to read pixels is changed (for example, change to the next lower line), and the process returns to Step S4006 (No in Step S4028; Step S4032).

With reference back to FIG. 8, the file generator 108 generates a file (Step S116). When a handwriting area is present on the first page, replacement is made by the image data in which the handwriting area has been filled with the background pixel value during the process at Step S402. Therefore, when a handwriting area is present on the first page, the transmission data including the image data on the first page in which the handwriting area has been filled is generated during the process at Step S116.

Figure 10A:
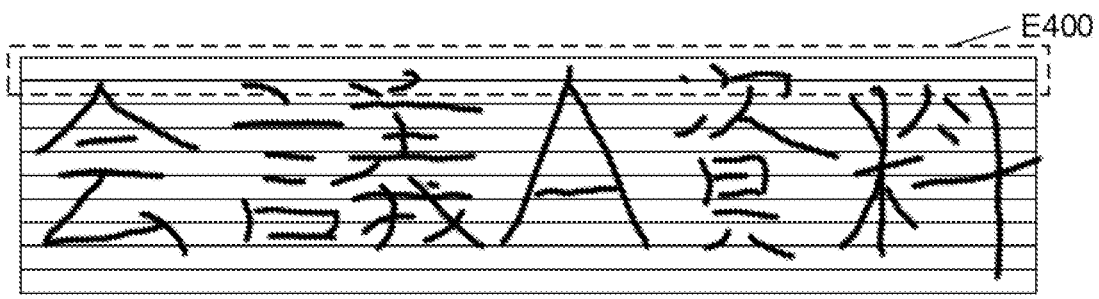
FIGS. 10A and 10B are diagrams illustrating an operation example according to the fourth embodiment.

An operation example according to the present embodiment is described with reference to FIGS. 10A and 10B. FIG. 10A is a diagram illustrating the image data on the handwriting area "CONFERENCE A MATERIAL" written in Japanese. The area indicated by an area E400 in FIG. 10A is the area of a first line.

Figure 10B:
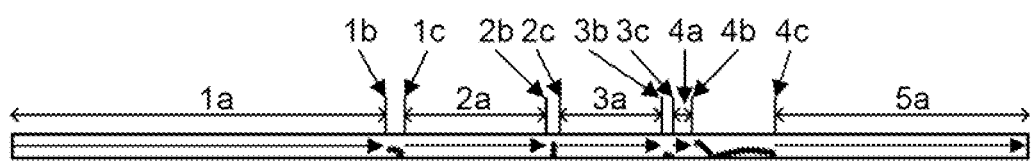

FIG. 10B is a diagram illustrating the area of the first line. In FIG. 10B, a section 1*a*, a section 2*a*, a section 3*a*, a section 4*a*, and a section 5*a* indicate a section including the pixels used to calculate a background pixel value. In FIG. 10B, a position 1*b*, a position 2*b*, a position 3*b*, and a position 4*b* indicate the position of a rising edge. In FIG. 10B, a position 1*c*, a position 2*c*, a position 3*c*, and a position 4*c* indicate the position of a falling edge.

The controller 100 scans the pixels one by one on the line in a rightward direction, starting from the pixel on the leading end of the line, to read the pixels on the line. In the example of FIG. 10B, the pixels on the line are sequentially read, starting from the pixel on the leading end (left end) of the line to the position 1*b* including the pixel at the rising edge, and the pixel value of the read pixel is added to the addition result of the pixel values. That is, the controller 100 adds the pixel value of a pixel included in the section that does not include a pixel at the rising or falling edge and does not include handwritten characters (handwritten figures recognized as handwritten characters) to the addition result of the pixel values.

Then, as the pixel at the rising edge is included in the position 1*b*, the controller 100 sets a background pixel value at this point. Furthermore, as the pixel at the falling edge is included in the position 1*c*, the controller 100 replaces the pixels included in the position 1*b* to the position 1*c* with the background pixel value to fill the pixels. That is, the pixels included in the position 1*b* to the position 1*c* are filled with the average value of the pixel values of the pixels included in the section 1*a*, which is the section from the pixel at the leading end of the line to the position 1*b*. The controller 100 initializes the addition result of the pixel values.

Subsequently, the controller 100 reads pixels in a rightward direction. As the pixel at the rising edge is included in the position 2*b*, the controller 100 sets a background pixel value at this point. The pixels included in the position 2*b* up to the position 2*c* are filled with the background pixel value. Specifically, the pixels included in the position 2*b* up to the position 2*c* are filled with the average value of the pixel values of the pixels included in the section 2*a*, which is the section from the position 1*c* including the previous falling edge to the position 2*b* including the rising edge.

Subsequently, in the same manner, the pixels included in the position 3*b* including the rising edge up to the position 3*c* including the falling edge are filled with the average value of the pixel values of the pixels included in the section 3*a*. The pixels included in the position 4*b* including the rising edge up to the position 4*c* including the falling edge are filled with the average value of the pixel values of the pixels included in the section 4*a*. As no edge pixel is included from the position 4*c* including the falling edge to the terminal end (right end) of the line, the controller 100 does not execute filling on the section 5*a* that is the section from the position 4*c* to the terminal end of the line.

According to the present embodiment, the image forming apparatus fills the handwritten figure written by the user with the background pixel value so as to obtain the image of the document that is close to the state including no handwritten characters and then generate a file. For the user, it is possible that the handwritten characters written to set the file name are unnecessary writing in terms of the original description of the document. In such a case, as the unnecessary description is filled (deleted) by the image forming apparatus, the user may prevent another user who receives the file from recognizing the handwritten characters written to set the file name.

Although handwritten characters are deleted in the description according to the present embodiment, for example, the image representing the typed characters of handwritten characters may be synthesized at the position where the deleted handwritten characters were displayed after the handwritten characters were deleted. For example, before the handwritten character filling process is performed at Step S4030, the controller 100 reads the character recognition result information 176 and generates the image data in which the recognized characters are output in a predetermined font so as to generate the image data on the typed characters. The controller 100 superimposes the image data on the generated typed characters on the image data targeted for the handwritten character filling process at the position where the deleted handwritten characters were displayed. This makes it possible to leave the handwritten characters as the typed characters at the position where the handwritten characters were written at Step S4030.

5. Fifth Embodiment

Next, a fifth embodiment is described. Contrary to the first embodiment, a file name is set based on a handwriting area when a file name extraction mark is present in the handwriting area according to the present embodiment. The file name extraction mark is a symbol such as a circle, a double circle, or an arrow. In the present embodiment, FIG. 4 of the first embodiment is replaced with FIG. 11. The same functional units and processes are attached with the same reference numeral, and descriptions are omitted.

Figure 11:
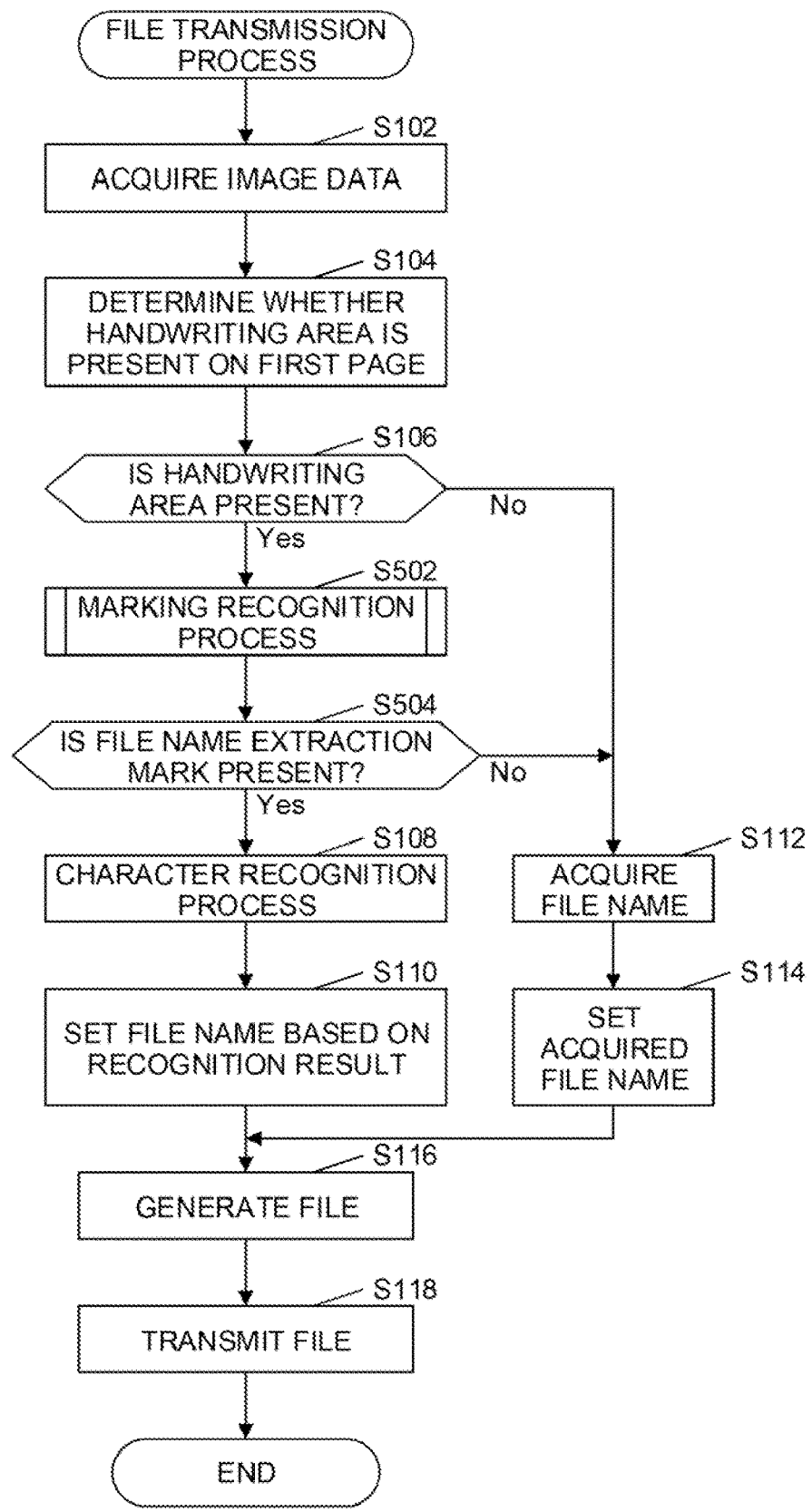
FIG. 11 is a flowchart illustrating a file transmission process according to a fifth embodiment.
Figure 12:
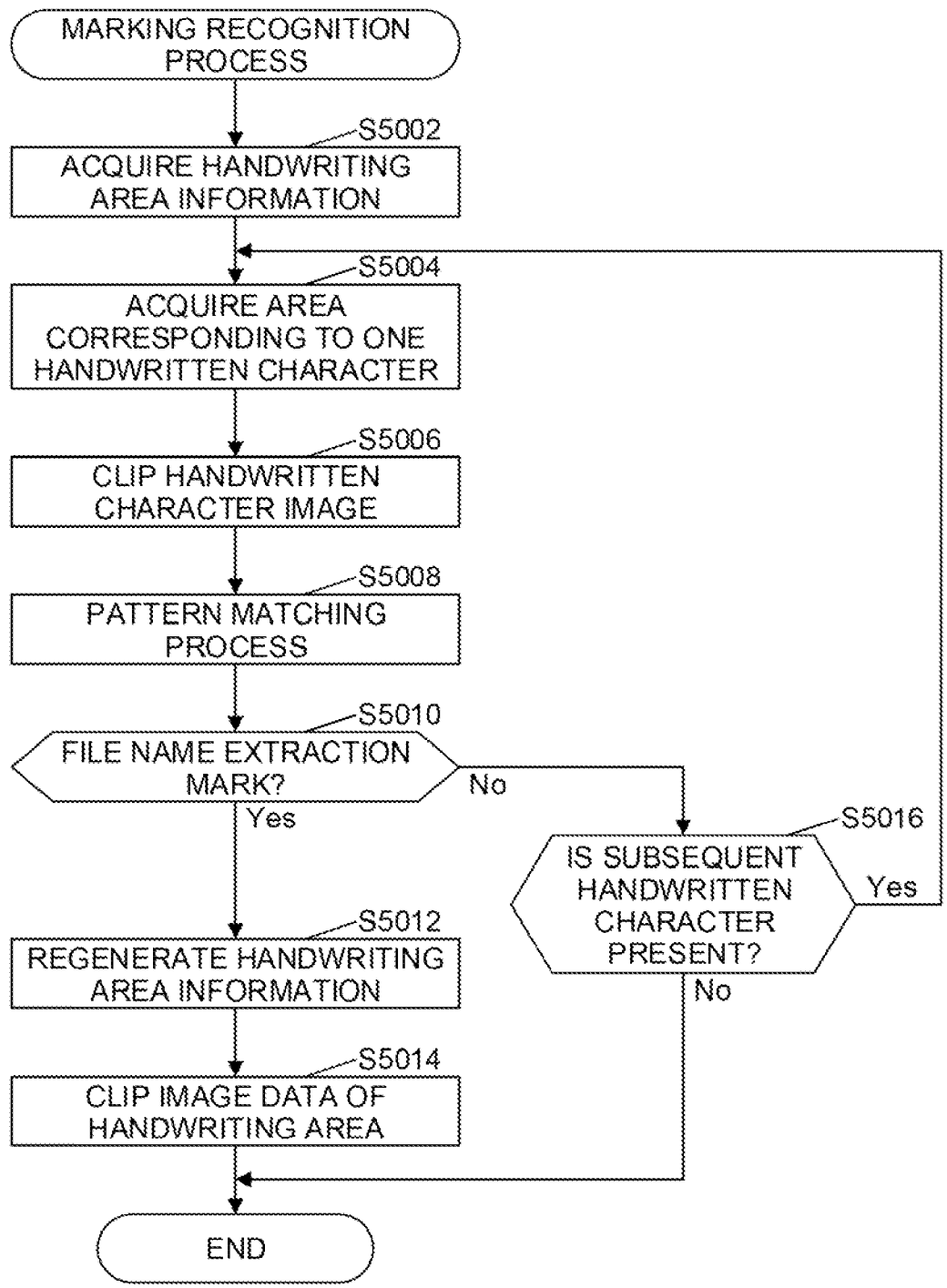
FIG. 12 is a flowchart illustrating a marking recognition process according to the fifth embodiment.
Figure 13:
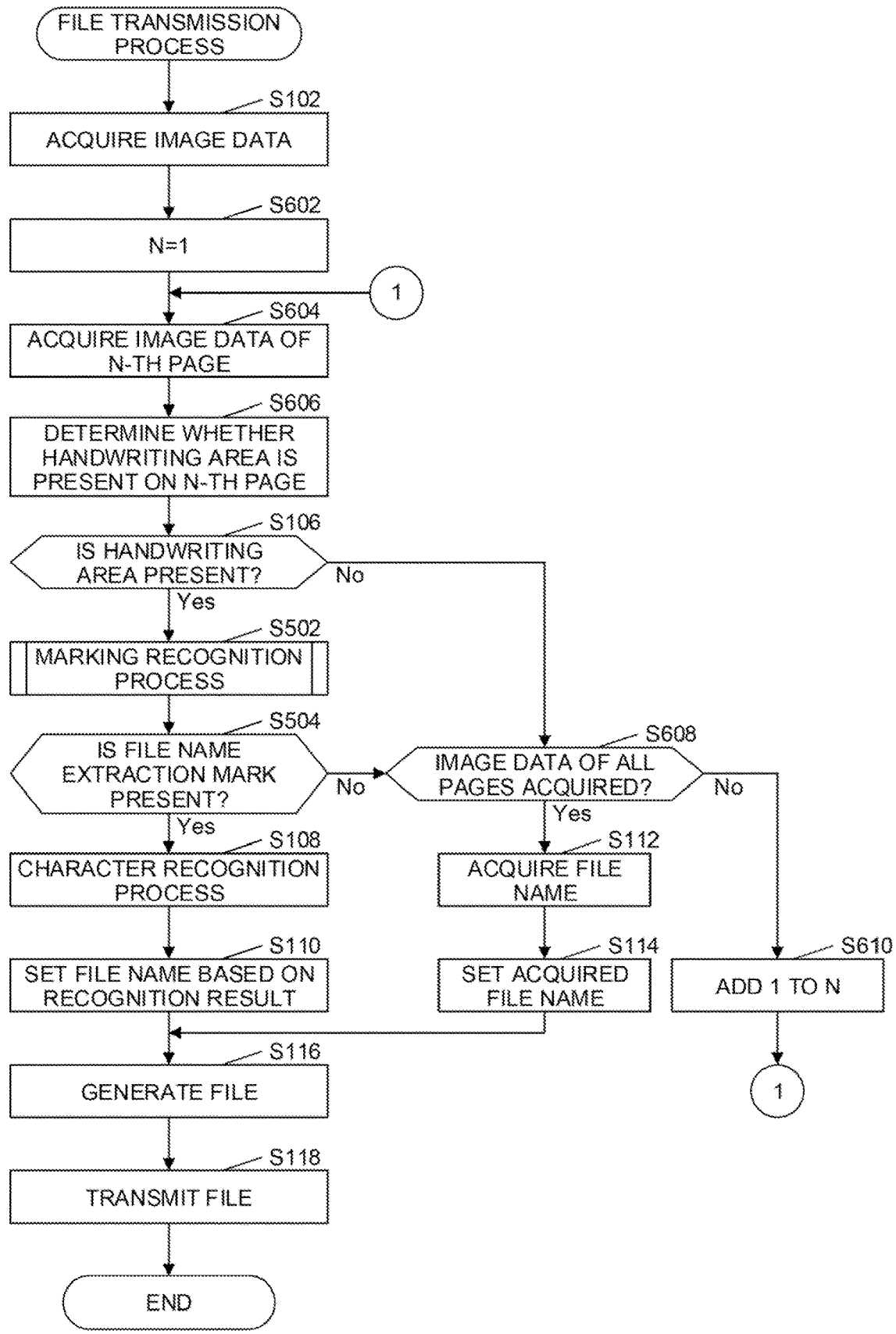
FIG. 13 is a flowchart illustrating a file transmission process according to a sixth embodiment.

The flow of a file transmission process according to the present embodiment is described with reference to FIG. 11. According to the present embodiment, when the image data on the first page of the document includes a handwriting area, the file name setter 106 executes a marking recognition process (Yes in Step S106; Step S502). The marking recognition process is described with reference to FIG. 12.

First, the file name setter 106 acquires the handwriting area information from the handwriting area information storage area 174 (Step S5002). The file name setter 106 identifies the handwriting area from the image data on the first page of the document based on the coordinate information stored in the acquired handwriting area information and acquires the image data of the handwriting area.

Subsequently, the file name setter 106 acquires the area of the handwritten character corresponding to one character from the image data of the handwriting area (Step S5004). For example, the file name setter 106 divides the image data of the handwriting area into rectangular areas corresponding to one character and acquires each of the areas as the area of a handwritten character corresponding to one character. The area of a handwritten character corresponding to one character may be, for example, a polygonal area.

Subsequently, the file name setter 106 clips the image data corresponding to one character from the image data of the handwriting area based on the area of the handwritten character corresponding to one character acquired at Step S5004 (Step S5006). Then, the file name setter 106 performs a pattern matching process on the image based on the image data corresponding to one character clipped at Step S5006 and the image of the file name extraction mark (Step S5008). The file name extraction mark may be set by the user of the image forming apparatus 10 or may be previously set in the image forming apparatus 10. The image data on the file name extraction mark may be stored in the storage 170.

Subsequently, the file name setter 106 determines whether the image corresponding to one character matches the image of the file name extraction mark (Step S5010). The degree of similarity, the feature value to be emphasized for pattern matching, and the like, to determine that the image corresponding to one character matches the image of the file name extraction mark may be previously set or may be set by the user. Pattern matching processing using machine learning may be performed.

When the image corresponding to one character matches the image of the file name extraction mark, the file name setter 106 regenerates the handwriting area information in which the area excluding the area of the file name extraction mark from the handwriting area is a new handwriting area (Yes in Step S5010; Step S5012). Specifically, the file name setter 106 replaces the handwriting area information read at Step S5002 with the handwriting area information on the handwriting area excluding the area of the file name extraction mark regenerated at Step S5012 and stores the handwriting area information again. The file name setter 106 clips the image data on the handwriting area from the image data on the first page of the document based on the handwriting area information regenerated at Step S5012 (Step S5014).

Conversely, when the image corresponding to one character does not match the image of the file name extraction mark, the file name setter 106 determines whether the subsequent handwritten character is present (No in Step S5010; Step S5016). For example, the file name setter 106 determines that the subsequent handwritten character is present when the image data on the handwriting area acquired at Step S5002 has an image that has not been clipped. The file name setter 106 returns to Step S5004 when there is the subsequent handwritten character (Yes in Step S5016; Step S5004). When there is no subsequent handwritten character, the marking recognition process ends (No in Step S5016).

With reference back to FIG. 11, the file name setter 106 determines whether a file name extraction mark is present in the handwriting area (Step S504). Specifically, in a case where, during the marking recognition process, it is determined that any character in the handwriting area has matched the file name extraction mark or the handwriting area information has been regenerated, the file name setter 106 may determine that the file name extraction mark is present in the handwriting area.

When the file name extraction mark is present in the handwriting area, the character recognizer 104 executes, at Step S108, a character recognition process on the image data clipped at Step S5014.

When it is determined at Step S504 that no file name extraction mark is present in the handwriting area, the file name setter 106 acquires and sets a file name (No in Step S504; Step S112, Step S114). Specifically, when the handwriting area does not include the file name extraction mark although the image data on the first page of the document has the handwriting area, the file name setter 106 ignores the handwriting area.

According to the present embodiment, the image forming apparatus may select whether a file name is to be set based on the recognition result of a handwritten figure depending on the presence or absence of a file name extraction mark even in a case where the first page of the document includes a handwriting area. Thus, as the user attaches a file name extraction mark to the handwritten characters that are to be a file name, the image forming apparatus identifies the handwritten characters as a file name; thus, the necessary handwritten characters may be set as a file name.

6. Sixth Embodiment

According to a sixth embodiment, a file name is set based on a handwriting area in a case where a file name extraction mark is present in the handwriting area even when the image data is of other than the first page. In the present embodiment, FIG. 11 of the fifth embodiment is replaced with FIG.

13. The same functional units and processes are attached with the same reference numeral, and descriptions are omitted.

During the file transmission process according to the present embodiment, after the process of acquiring the image data, the controller 100 assigns 1 to a variable N indicating the page number (Step S602) and acquires the image data on an N-th page (Step S604).

Subsequently, the controller 100 determines whether a handwriting area is present on the N-th page (Step S606). For example, first, the handwriting determiner 102 determines a handwriting area from the image data on the N-th page and stores the handwriting area information in the handwriting area information storage area 174. Then, the controller 100 determines whether the handwriting area information storage area 174 stores the handwriting area information.

When the controller 100 determines that a handwriting area is present, the file name setter 106 executes a marking recognition process to determine whether a file name extraction mark is present (Yes in Step S106; Step S502, Step S504). When no file name extraction mark is present, the controller 100 determines whether the image data on all the pages have been acquired (No in Step S504; Step S608).

When the image data on all the pages have not been acquired, the controller 100 adds 1 to N and returns to Step S604 (No in Step S608; Step S610, Step S604).

The controller 100 also performs the process at Step S608 when it is not determined that a handwriting area is present at Step S106 (No in Step S106; Step S608).

As described above, according to the present embodiment, the marking recognition process is performed in order, starting from the image data on the first page, and when a file name extraction mark is present, handwritten character recognition is executed so that a file name may be set based on a recognition result. Thus, the user may write characters by hand even on a page other than the first page and further writes a file name extraction mark so as to designate the characters to be set as a file name.

7. Seventh Embodiment

Next, a seventh embodiment is described. According to the present embodiment, an appropriate file name is set even when the image data on the first page of the document include multiple (two or more) handwriting areas. In the present embodiment, FIG. 4 of the first embodiment is replaced with FIG. 14. The same functional units and processes are attached with the same reference numeral, and descriptions are omitted.

Figure 14:
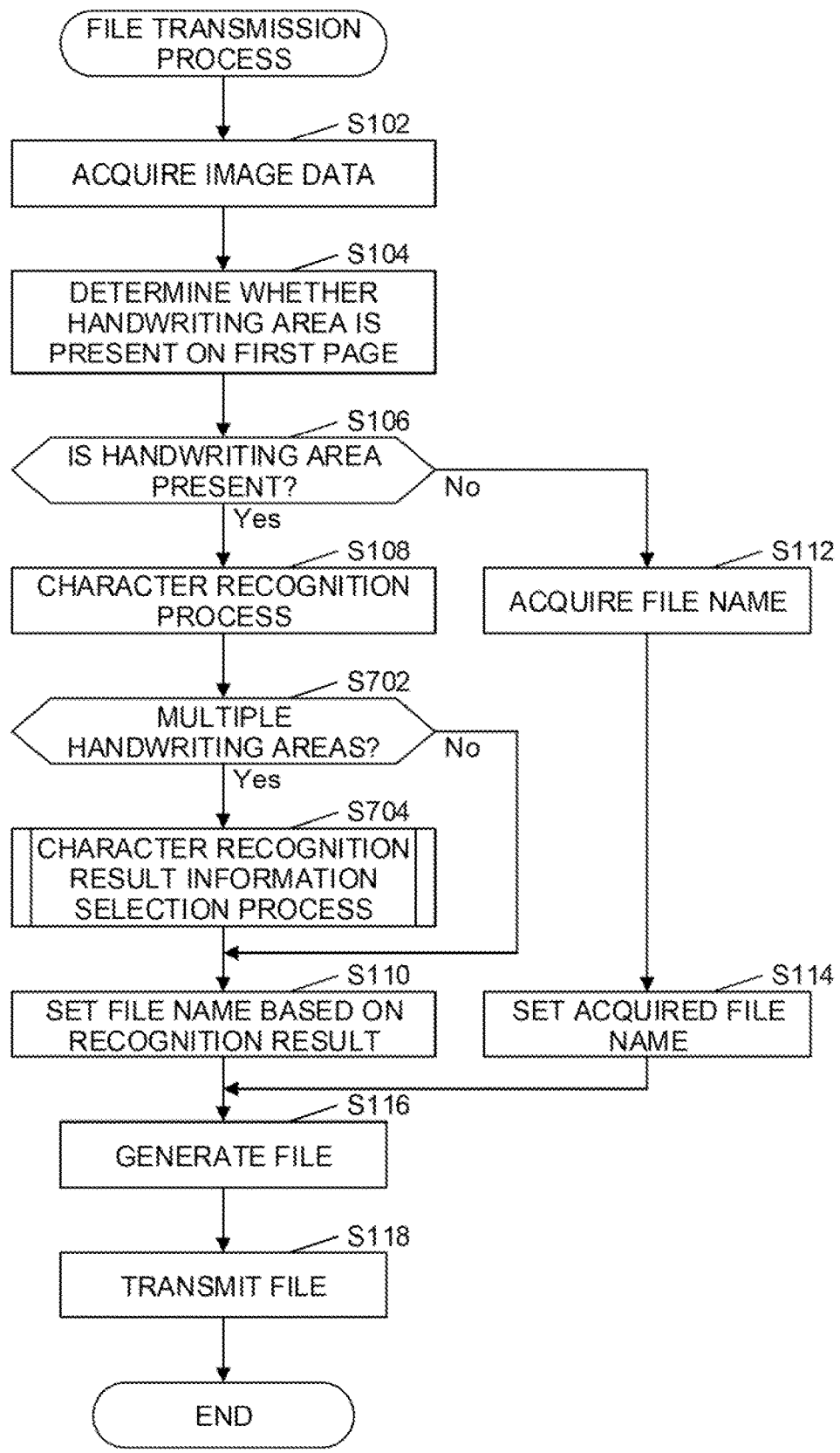
FIG. 14 is a flowchart illustrating a file transmission process according to a seventh embodiment.

The flow of a file transmission process according to the present embodiment is described with reference to FIG. 14. According to the present embodiment, the character recognizer 104 executes a character recognition process at Step S108 and, at this point, the information on the area including the recognized characters are also stored together with the recognized characters as the character recognition result information 176. The information on the area includes the coordinates with which the area may be identified and the size (area) information on the area. Subsequently, the file name setter 106 determines whether multiple (two or more) handwriting areas are present in the image data on the first page of the document (Step S702). Specifically, the file name setter 106 may determine that multiple handwriting areas are present when the storage 170 stores multiple sets of the character recognition result information 176.

When multiple handwriting areas are present, the file name setter 106 executes a character recognition result information selection process to select one set of the character recognition result information 176 from the multiple sets of the character recognition result information 176 (Yes in Step S702; Step S704). Specifically, the file name setter 106 selects one set of the character recognition result information 176 in accordance with the following method.

(1) Method Based on the Size of a Handwriting Area

This method is to set a file name based on the handwriting area written by the user and having the largest size among the handwritings on the document. For example, the file name setter 106 selects the character recognition result information 176 having the largest size of the area from the character recognition result information 176 based on the area information. The file name setter 106 may select the character recognition result information 176 having the smallest size of the area from the character recognition result information 176 based on the area information. The criterion for the size of a handwriting area to be selected by the file name setter 106 may be set by the user.

(2) Method Based on the Position of a Handwriting Area

This method is to set a file name based on the handwriting area located on the uppermost side of a document among the handwritings on the document. For example, the file name setter 106 selects the character recognition result information 176 including the information on an area closest to the upper side of the image data from the sets of the character recognition result information 176. The file name setter 106 may set a file name based on the handwriting area located at the lowermost (leftmost or rightmost) side of the document or may set a file name based on the handwriting area located closest to any one corner of the document. The position of the handwriting area selected by the file name setter 106 may be set by the user.

(3) Method Based on the Color of a Handwritten Figure

This method is to set a file name based on a handwritten figure that is written in a specific color (e.g., red) among multiple handwritten figures written on the document. The file name setter 106 identifies the color of the handwritten figure included in the area specified by the area information for each set of the character recognition result information 176. The file name setter 106 selects the character recognition result information 176 whose identified color is a predetermined color. The predetermined color may be previously set in the image forming apparatus 10 or may be set by the user. The file name setter 106 may select the character recognition result information 176 based on the color of a portion (e.g., the color of the background) other than a handwritten figure included in the handwriting area.

(4) Method Based on the Presence or Absence of a File Name Extraction Mark

This method is to set a file name based on the handwriting area in which a file name extraction mark is written among multiple handwritings on the document. The file name setter 106 executes the marking recognition process described in the fifth embodiment on the area specified by the area information for each set of the character recognition result information 176. The file name setter 106 selects the character recognition result information 176 in which the information for specifying the area including the file name extraction mark is included as the area information.

(5) Method Based on a Recognition Result of the Character Recognizer 104

This method is to set a file name based on a handwriting area in which specific characters or pattern is written among multiple handwritten figures written on a document. The file name setter 106 selects the character recognition result information 176 including specific characters from the sets of the character recognition result information 176. The specific characters may be, for example, a specific word such as "attachment" or "material", the characters indicating an extension such as ".pdf", ".jpg", or ".tiff", or the 8-characters number pattern indicating the date such as "20190601". The word as specific characters and the pattern may be previously set in the image forming apparatus 10 or may be set by the user.

The method that is used by the file name setter 106 to select the character recognition result information 176 may be selected by the user from the above-described methods, or multiple methods may be combined. The file name setter 106 may select the character recognition result information 176 by using a method other than the above-described methods.

As described above, even when there are multiple handwriting areas, the file name setter 106 may set a file name based on one set of character recognition result information. When there is one handwriting area, the file name setter 106 skips the process at Step S704 and transitions to Step S110 (Step S702; No). In this case, the file name setter 106 sets a file name based on one set of character recognition result information as in the first embodiment.

According to the present embodiment, even when the first page of the document includes multiple handwriting areas, the image forming apparatus may select one handwriting area and then set a file name.

When the image forming apparatus sets a file name based on the presence or absence of an extraction mark, the user may write a file name extraction mark on one of the handwriting areas to designate the characters to be set as a file name among the handwritten characters.

8. Modification

Although the image forming apparatus provided in the information processing apparatus has been described above, the information processing apparatus according to the present invention is applicable to a terminal device, a server device, or an image reading device such as a scanner. That is, a terminal device, a server device, an image reading device, or the like, may be configured to generate a file with a file name set based on the image data corresponding to the document on the first page.

The present invention is not limited to the above-described embodiments and may be variously modified. That is, the technical scope of the present invention also includes embodiments obtained by combining technical measures that are modified as appropriate without departing from the scope of the present invention.

Although parts of the above embodiments are described separately from one another for convenience of description, it is obvious that the embodiments may be executed in combination within a technically possible range. For example, the third embodiment and the seventh embodiment may be combined so that a file name is set based on the handwriting area including the file name extraction mark among the handwriting areas in the image data on the first page of the document and the image data on the first page of the document is deleted.

A program running in each device according to the embodiment is a program that controls the CPU, and the like, (a program that causes the computer to function) so as to perform the functions in the above-described embodiment. The information processed in the devices is temporarily stored in a temporary storage device (e.g., RAM) during a process and then stored in various storage devices such as a read only memory (ROM) and an HDD so that the information is read by the CPU to be modified and written as needed.

The recording medium for storing the program may be a semiconductor medium (e.g., a ROM or a non-volatile memory card), an optical recording medium/a magneto-optical recording medium (e.g., a digital versatile disk (DVD), a magneto-optical (MO) disc, MiniDisc (MD), Compact Disc (CD), or Blu-ray Disc (BD) (registered trademark)), a magnetic recording medium (e.g., a magnetic tape or a flexible disc), etc. Not only the functions in the above-described embodiments are performed by executing the loaded program, but also the functions of the present invention may be performed by executing processing in cooperation with the operating system, other application programs, or the like, in accordance with an instruction of the program.

To distribute the program to the market, the program may be stored and distributed in a portable recording medium or may be transferred to a server computer connected via a network such as the Internet. In this case, it is obvious that the present invention includes a storage device of the server computer.

What is claimed is:

1. An information processing apparatus comprising a processor configured to operate as:
   a determiner that determines an area including a handwritten figure from image data;
   a recognizer that recognizes a handwritten character from the handwritten figure;
   an acquirer that acquires a file name; and
   a file generator that generates a file with a file name based on a handwritten character when the recognizer recognizes the handwritten character based on the image data and generates a file with the file name acquired by the acquirer when the recognizer does not recognize a handwritten character.

2. The information processing apparatus according to claim 1, wherein the determiner determines an area including a handwritten figure from a margin area of the image data.

3. The information processing apparatus according to claim 1, wherein the determiner determines an area including a handwritten figure from an area that is not included in any of a character area, a photograph area, a halftone dot area, and a background area.

4. The information processing apparatus according to claim 1, wherein the file name is editable.

5. The information processing apparatus according to claim 1, wherein, in a case where the image data is image data on a document having multiple pages, the file generator generates a file with a file name based on a handwritten character when the recognizer recognizes the handwritten character based on image data on a first page of the document.

6. The information processing apparatus according to claim 5, wherein the file generator generates the file based on image data other than the image data on the first page of the document.

7. The information processing apparatus according to claim 1, wherein the file generator generates a file from which the handwritten character has been deleted.

8. The information processing apparatus according to claim 7, wherein, the handwritten character has been deleted by filling the handwritten figure with a color in the area.

9. The information processing apparatus according to claim 1, wherein, when an area determined by the determiner includes an image of a predetermined mark, the file generator generates a file with a file name based on the handwritten character recognized based on a handwritten figure included in the area.

10. The information processing apparatus according to claim 1, wherein, when the determiner determines multiple areas, the file generator generates a file with a file name based on a handwritten character recognized based on a handwritten figure included in one of the areas.

11. The information processing apparatus according to claim 10, wherein, the one of the areas is selected based on the one's size.

12. The information processing apparatus according to claim 10, wherein, the one of the areas is selected based on a color of the handwritten figure in the one of the areas.

13. A control method comprising determining an area including a handwritten figure from image data;
recognizing a handwritten character from the handwritten figure;
acquiring a file name; and
generating a file with a file name based on a handwritten character when the handwritten character is recognized at the recognizing based on the image data and generating a file with the file name acquired at the acquiring when a handwritten character is not recognized at the recognizing.

14. A non-transitory computer-readable recording medium having stored therein a program that causes a computer to execute:
a determination function to determine an area including a handwritten figure from image data;
a recognition function to recognize a handwritten character from the handwritten figure;
an acquisition function to acquire a file name; and
a file generation function to generate a file with a file name based on a handwritten character when the recognition function recognizes a handwritten character based on the image data and generate a file with the file name acquired by the acquisition function when the recognition function does not recognize a handwritten character.

* * * * *